United States Patent [19]
Takahashi et al.

[11] Patent Number: 5,789,683
[45] Date of Patent: *Aug. 4, 1998

[54] CONSTRUCTION IN WHICH SENSING ELEMENTS FOR SENSING A LOAD ON A VEHICLE ARE MOUNTED

[75] Inventors: Naoya Takahashi, Shimada; Yutaka Atagi; Yoshitaka Yasuda, both of Kawasaki, all of Japan

[73] Assignees: Yazaki Corporation; Isuzu Motors Limited, both of Tokyo, Japan

[*] Notice: The term of this patent shall not extend beyond the expiration date of Pat. No. 5,681,998.

[21] Appl. No.: 717,681

[22] Filed: Sep. 23, 1996

Related U.S. Application Data

[63] Continuation of Ser. No. 627,337, Apr. 4, 1996, abandoned, which is a continuation of Ser. No. 393,429, Feb. 23, 1995, abandoned.

[30] Foreign Application Priority Data

Feb. 25, 1994 [JP] Japan .................................. 6-28037

[51] Int. Cl.$^6$ .................... G01G 19/00; G01G 21/00; B60P 5/00; G01L 1/00
[52] U.S. Cl. .................... 73/862.621; 73/767; 73/781; 73/862.632
[58] Field of Search .................... 73/764, 767, 768, 73/775, 781, 785, 788, 794, 802, 65.05, 862.621, 862.627, 862.628, 862.632

[56] References Cited

U.S. PATENT DOCUMENTS

| | | | |
|---|---|---|---|
| 2,890,826 | 6/1959 | Cushman | 73/65.05 |
| 3,661,220 | 5/1972 | Harris | 73/862.632 |
| 3,722,264 | 3/1973 | Talmo et al. | 73/781 |
| 3,743,041 | 7/1973 | Videon | 73/862.632 |
| 3,975,685 | 8/1976 | Bielsten et al. | 73/767 |
| 4,042,049 | 8/1977 | Reichow et al. | 73/767 |
| 4,055,078 | 10/1977 | D'Antonio et al. | 73/767 |
| 4,086,576 | 4/1978 | Jebb et al. | 73/767 |
| 4,581,948 | 4/1986 | Reichow | 73/862.632 |
| 4,666,003 | 5/1987 | Rechow | 73/862.632 |
| 5,287,757 | 2/1994 | Polaert et al. | 73/862.627 |

FOREIGN PATENT DOCUMENTS 6-69760  9/1994  Japan .

OTHER PUBLICATIONS

Ser. No. 08/213,727, Mar. 16, 1994, Pending.

*Primary Examiner*—George M. Dombroske
*Attorney, Agent, or Firm*—Armstrong, Westerman, Hattori, McLeland & Naughton

[57] ABSTRACT

(Purpose) A construction for mounting a load-sensing element for use with a vehicle, in which construction no measurement error is resulted even if the slide plate contacts the leaf spring at different contacting points.

(Construction) The sensing element 21 is composed of opposed walls forming a substantially U-shape in both front and side views thereof and having a hollow portion therein, and a plate-like member made of a magnetic material, which plate-like member being inserted into the hollow portion and threaded by a coil to be held therein, wherein the mounting location 15$f$ of the slide plate 15 is a groove into which said sensing element 21 is fitted; wherein the construction further includes a lid which fits over the sensing element and a wedge-like key inserted under the sensing element for fixing the sensing element. The output of the sensing elements are added together so as to output a sum of the outputs of the sensing elements.

4 Claims, 5 Drawing Sheets

FIG. 1C
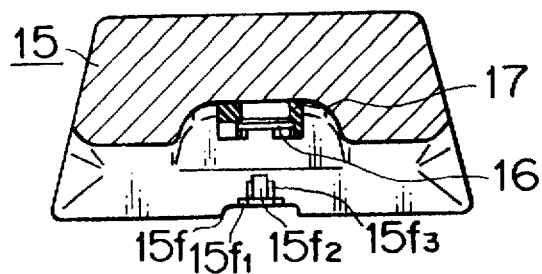
FIG. 1A
FIG. 1B
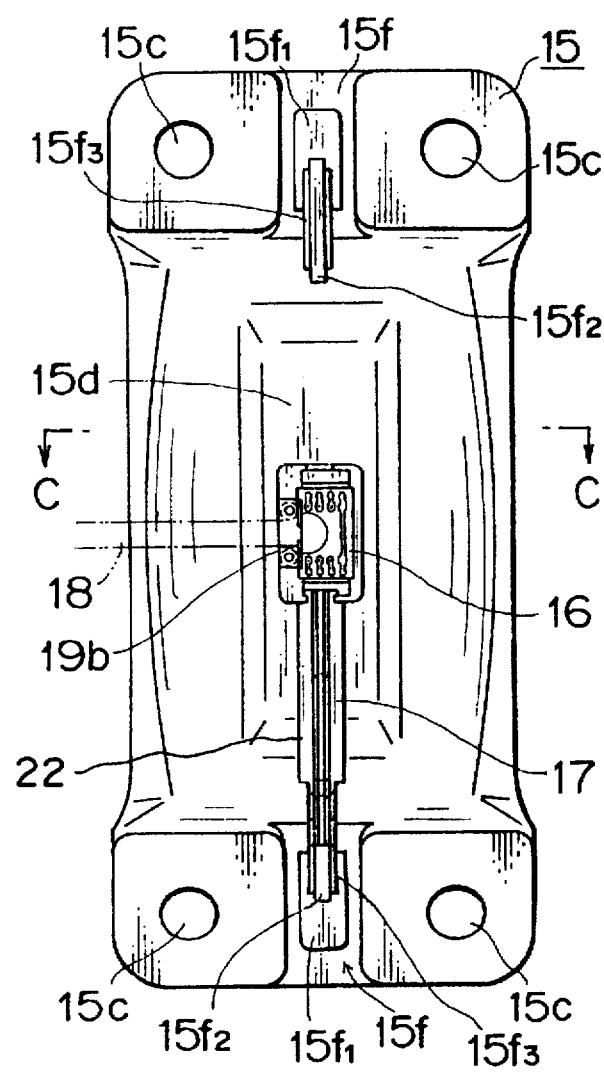
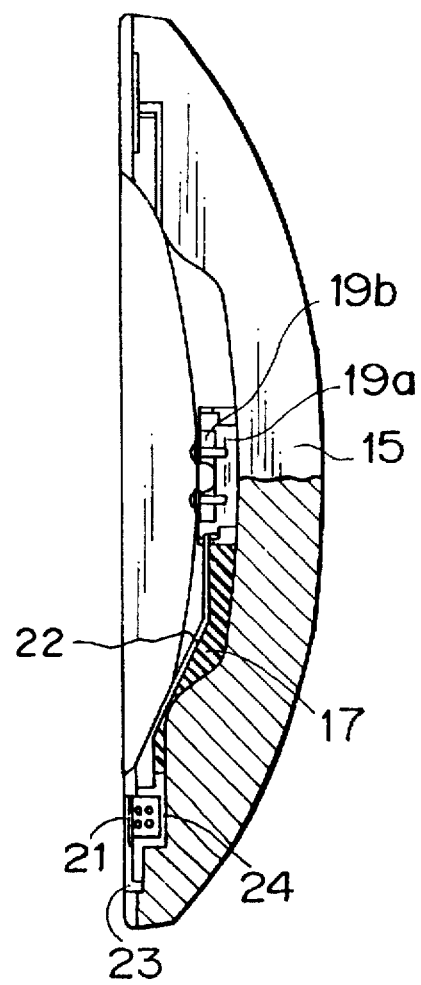

5,789,683

1

CONSTRUCTION IN WHICH SENSING ELEMENTS FOR SENSING A LOAD ON A VEHICLE ARE MOUNTED

This application is a continuation application of Ser. No. 08/627,337 filed Apr. 4, 1996, now abandoned; which is a continuation of Ser. No. 08/393,429 filed Feb. 23 1995, now abandoned.

FIELD OF THE INVENTION

The present invention relates to a construction is which sensing elements for sensing a load on a vehicle are mounted.

PRIOR ART

Conventionally, a load on a vehicle is measured with a load-measuring apparatus installed on the road. Such an apparatus is generally of large size and high cost, and therefore places limitations on both the number of apparatuses installed and locations where the apparatuses are installed. Thus, only a limited number of vehicles may have loads measured thereon, which is not enough to ensure the detection of overload on all vehicles. In order to overcome the drawback, it is becoming more common that the vehicle is equipped with a self load-measuring apparatus. One such load-measuring apparatus employs a strain gauge type sensor welded to the surface of the axle box of a vehicle. The sensing element detects a bending strain developed in the axle due to the load on the axle via a leaf spring.

However when the vehicle tilts due, for example, to a rough road surface, loads are exerted on the axle in different vectorial directions. This causes different strains to be developed in the sensing element for the same total load, resulting in different measurements.

As shown in FIG. 6, a large vehicle has two axle cases 12a and 12b if the rear wheels are arranged one behind the other. A leaf spring 13 rests at longitudinal ends thereof on the axle cases, and is secured at a middle portion thereof to the deck, not shown, of the vehicle. The deflection of the leaf spring 13 varies in accordance with the load on the vehicle, so that the relative distance between the contacts where the two ends of the spring 13 are in contact with each axle changes. In order to accommodate changes in the relative distance, a slide plate 15a (15b) having a cross section of a semispherical shape defining an arcuate support surface is arranged on axle case so that the leaf spring 13 slides over and is there by supported by, the surface of the slide plate 15a (15b). FIGS. 7A and 7B illustrate a construction for mounting a load-measuring apparatus for use with vehicles, which is disclosed in Japanese Utility Model No. 5-11528 by the Applicant of the instant application.

In the figures, a slide plate 15 is formed with four screw holes 15c for mounting the slide plate 15 with screws to the axle case, and a rectangular recess 15d in the middle. The recess 15d is provided to reduce the total weight of the slide plate while still maintaining sufficient mechanical strength of the slide plate since the majority of the load is exerted the near screw holes.

As shown in FIG. 7B, there are two generally U-shaped projections 15e each having a narrow groove in the middle in line with the narrow groove of the other projection. A plate-like rectangular sensing element 1 extends across the two projections being held and welded in a sandwiched relation between the grooves. The sensing element 1 is of a magnetic strain gauge type and made of a magnetic material such as Permalloy, and is formed with four small holes 1a

2 in the middle thereof through which a coil 1b is mounted and leads 2 are directed outwardly for external electrical connection.

As shown in FIG. 6, the slide plate 15 is mounted on the axle case 12a (12b) and the leads 2 are connected to a measuring apparatus not shown. A load of a vehicle exerted on the slide plate 15 via the leaf spring 13 causes the slide plate 15 to deform. The deflection of the slide plate in turn, causes the sensing element 1 to deform to output an output signal. This type of slide plate 15 may be used both for vehicles not having sensing elements mounted thereto and for those having sensing elements mounted thereto. Thus, this type of slide plate is advantageous in terms of cost, and is easy to mount to the axle case.

The leaf springs contact the slide plate at different contacting points depending on the size of load on the vehicle. Thus, forces exerted on the sensing elements differ in vectorial direction. The aforementioned construction has a possibility that measurement error may be involved.

SUMMARY OF THE INVENTION

An object of the invention is to provide a construction for mounting a load-sensing element for use with a vehicle, in which construction no measurement error results even if the slide plate contacts the leaf spring at different contacting points.

The present invention provides a mounting construction of a sensing element used for a load-measuring apparatus, in which construction the sensing elements are oppositely mounted near opposed ends, respectively, on the inner surface of the slide plate, and the output of the sensing elements are added together.

In a first embodiment of the invention, the sensing element may include a frame of a generally U-shape whose opposed walls 21a have slits 21d aligned in line with each other, and a plate-like magnetic material which is assembled to the frame and on which a coil is mounted. The slide plate is formed with grooves therein near opposed ends on the inner surface thereof. A lid is mounted over each groove and the sensing elements element is fitted into the groove. A wedge shaped key is inserted between the sensing element and the slide plate so as to securely fix the sensing element to the slide plate.

In a second embodiment of the invention, the sensing element may take the form of a generally T-shaped construction where an elongated plate-like material having a coil mounted thereon stands upright on the middle of a bottom plate. The slide plate is formed with grooves near opposed ends, respectively, and a lid is placed over each groove and the sensing element is fitted into the groove. Thereafter, a wedge-like key is inserted between the sensing element and the slide plate so as to securely fix the sensing element to the slide plate. The sensing element is preferably formed with a beveled projection having a slope corresponding to that of the wedge-like key.

BRIEF DESCRIPTION OF THE DRAWINGS

Features and other objects of the invention will become more apparent from the detailed description of the preferred embodiments with reference to the accompanying drawings in which:

FIGS. 1A–1C illustrate a first embodiment of the invention, FIG. 1A showing a bottom view of a slide plate, FIG. 1B showing a side view with a cross-sectional view in part, and FIG. 1C showing a front view with a partial cross-sectional view taken along lines C—C;

3

Figure 2:
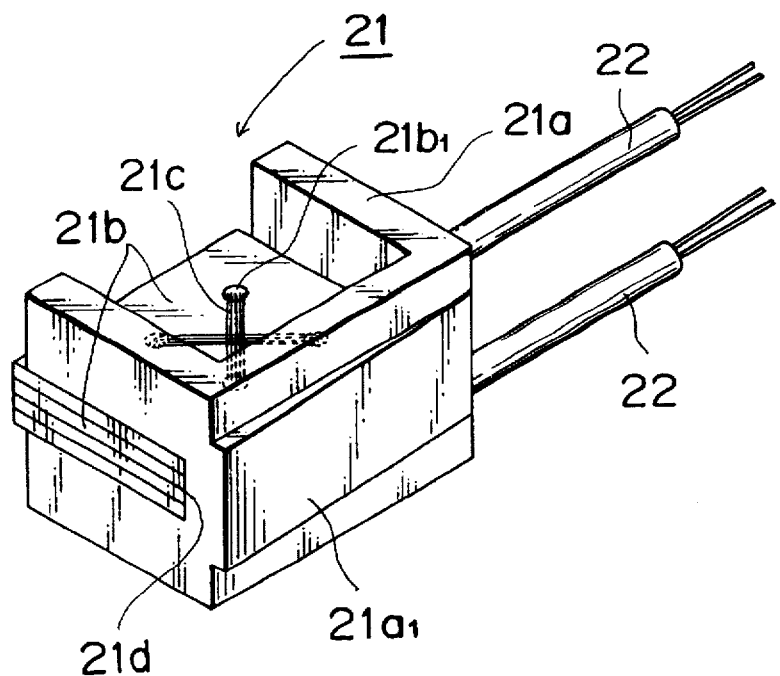
Figure 3:
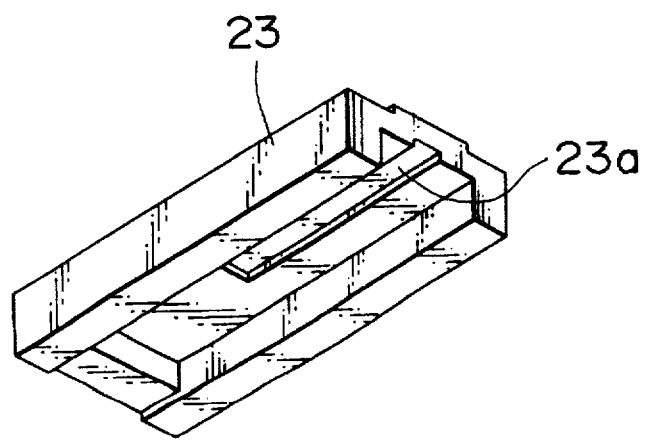
Figure 4:
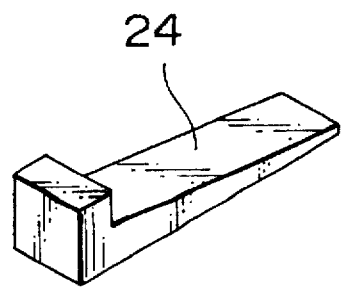
Figure 5:
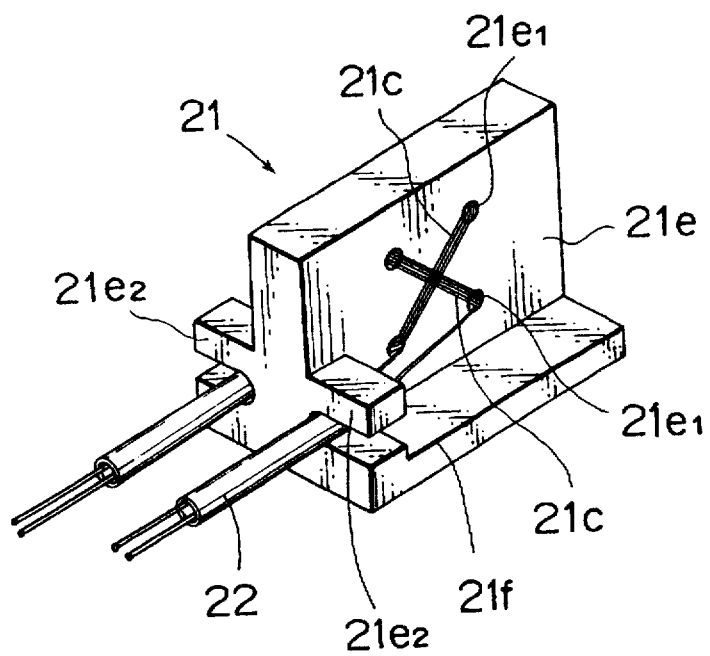
Figure 6:
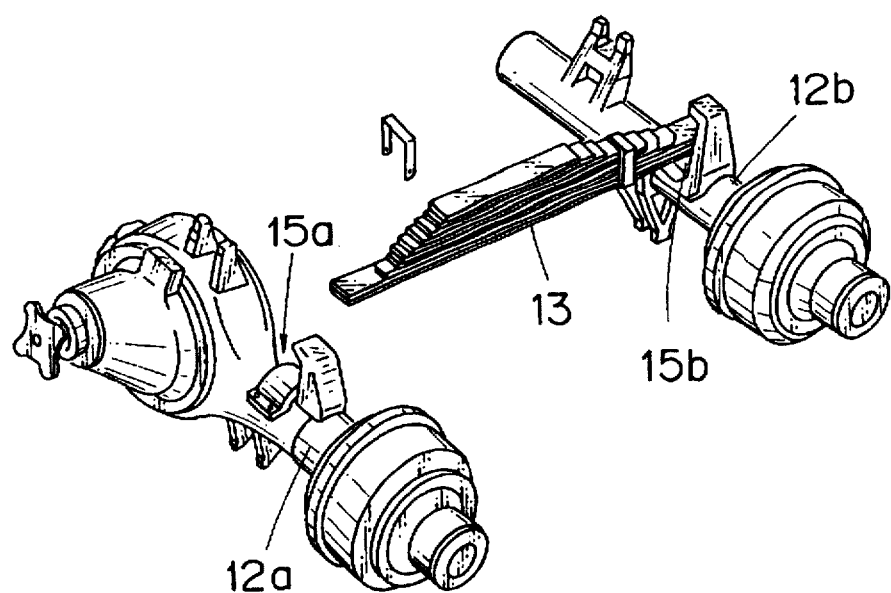
Figure 7A:
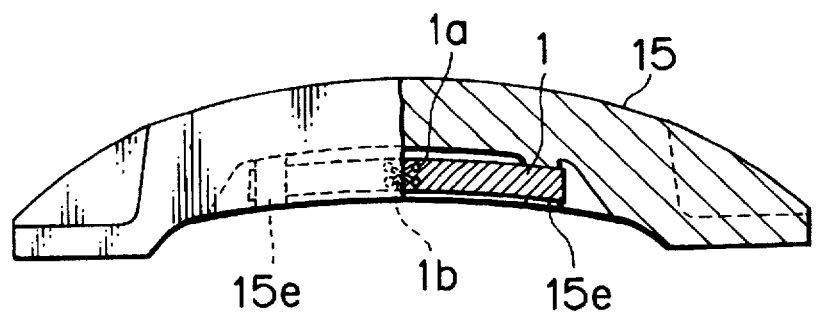
Figure 7B:
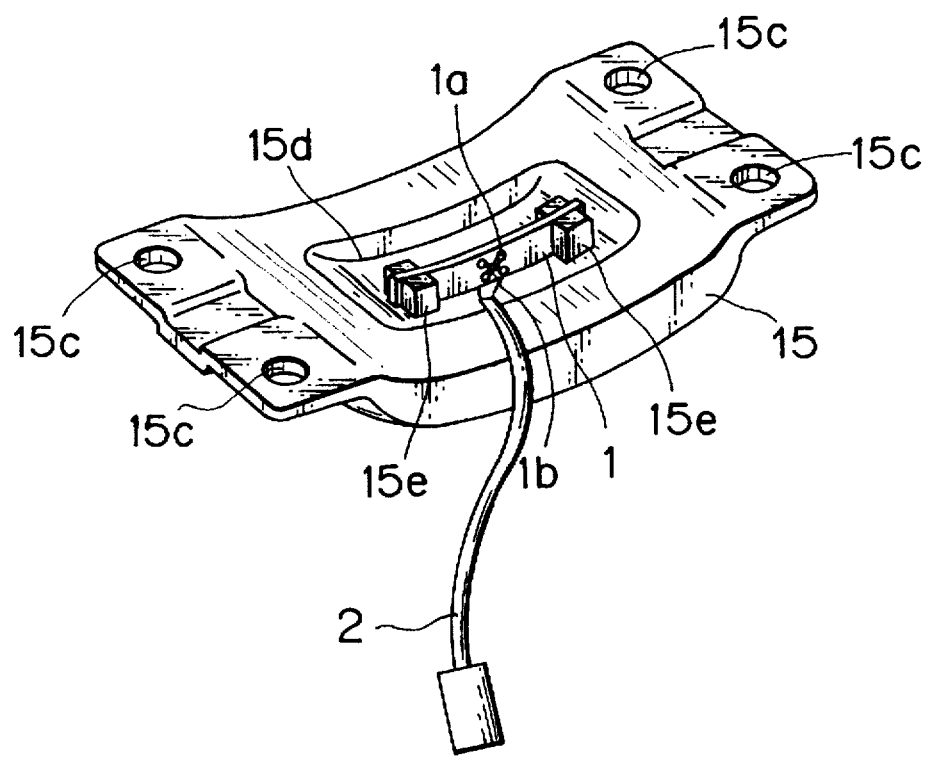

FIG. 2 is a perspective view of a sensing element;

FIG. 3 is a perspective view of a lid;

FIG. 4 is a perspective view of a wedge-like key;

FIG. 5 is a perspective view of a sensing element which is a modification of that of FIG. 2;

FIG. 6 is an exploded perspective view showing the relationship between the slide plate, axle, and leaf spring of a vehicle;

FIGS. 7A-7B illustrate a prior art construction for mounting a sensing element of a load-measuring apparatus, proposed by the inventor of the present application, FIG. 7A showing a side view with a cross section in part, and FIG. 7B showing a perspective view taken from the bottom of the construction.

DETAILED DESCRIPTION OF THE PREFERRED EMBODIMENTS

Operation

The load of a vehicle is transmitted to the slide plate via a leaf spring. The slide plate deforms due to the load exerted, which deformation of the slide plate causes the sensing element mounted on the inner surface of the slide plate to output an output signal in accordance with the load. The sensing elements are mounted near opposed ends, respectively, on the inner surface of the slide plate, and the outputs of the sensing elements are added together. When the load changes, the leaf spring contacts at slightly different points with the slide plate and, therefore, each sensing element is exerted by a force in a slightly different vectorial direction. This results in a deviation in output of each sensing element from what it otherwise should be. One output deviates to the slightly higher side and the other to the slightly lower side. However, the resultant sum of the outputs of the two elements remains substantially the same for the same load.

Embodiment

Preferred embodiments of the invention will be described with reference to the drawings. Like elements have been given like numerals throughout the drawings.

FIG. 1 shows a first embodiment of a construction for mounting a sensing element for load measurement of a vehicle according to the invention. FIG. 1A is a bottom view of a slide plate 15 for mounting sensing elements, on which a printed circuit board 16 is mounted. FIG. 1B is a cross-sectional side view of the slide plate 15, on one side of which is mounted a sensing element 21 with a lid 23 placed thereon. FIG. 1C is a front cross-sectional view. The slide plate of this embodiment is made of carbon steel.

As shown in the figures, each of the sensing elements 21 is mounted at each of mounting locations 15f provided near opposed ends on the inner surface of the slide plate 15. The mounting location 15f is positioned between two holes 15c through which screws are inserted to securely hold the slide plate 15 to an axle case. The mounting location includes a rectangular shallow groove 15f1, a narrow and deep groove 15f2 formed longitudinally in the middle of the shallow groove 15f1, and a groove 15f3 which is wider than the groove 15f2 and is formed vertically between the shallow groove 15f1 and groove 15f2. The groove 15f3 extends from the longitudinal middle of the slide plate to the shallow groove 15f1. The sensing element 21 is mounted at the mounting location 15f so that the sensing element 21 fits into the groove 15f3 while a later described beveled projection

4

21a1 of the sensing element 21 fitting into the groove 15f2. A later described lid 23 covers the sensing element 21 and fits into the shallow groove 15f1.

As shown in the figure, an elongated rubber 17 is bonded to the slide plate and extends from the mounting location 15f to the middle of the slide plate 15 where a printed circuit board 16 is fitted to the elongated rubber 17 in the middle of the slide plate. The elongated rubber 17 is formed with two longitudinal grooves that run along the rubber 17. Leads 22 of the sensing elements 21 are fitted into the grooves and are bonded to the rubber 17 by an adhesive. The tip ends of the leads 22 are connected to the board 16. It is to be noted that the rubber 17 is shown only over one longitudinal half of the slide plate for the sake of simplicity.

A projection 19a of a generally shallow U-shape is provided in a recess 15d in the rubber 17. The shallow U-shape receives a cable 18 and a lid 19b is fixed by screws to firmly hold the cable 18. The end of the cable 18 is connected to the circuit board 16 so that the outputs of the sensing elements 21, added together, are directed to an external circuit.

As shown in FIG. 2, the sensing element 21 is of a generally U-shape whose opposed walls 21a have slits 21d longitudinally aligned with each other, so that a plurality of plate-like members 21b of a magnetic material fit into the slits 21d. The magnetic members 21b are formed with four holes 21b1 therein through which a coil 21c is mounted in crossing winding. The end portions 22 of the coil 21c are directed out of the sensing element for connection to the circuit board 16.

The lid 23 is made of a metal of a generally U-shape. The lid 23 has a groove 23a in the inner surface thereof, which groove 23a receives the tip end of the magnetic member 21b which slightly projects from the walls 21a.

The lid 23 fits into the shallow groove 15f1 and is then welded or bonded to the slide plate. As shown in FIG. 4, a wedge shaped key 24 is firmly inserted between a beveled projection 21a1 of the sensing element 21 and the slide plate 15 so as to securely fix the sensing element 21 to the slide plate.

FIG. 5 shows another embodiment of the sensing element 21. A vertical plate 21e stands upright in the middle of a bottom plate 21f. The vertical plate 21e is formed with four holes 21e1 therein through which coils 21c are mounted. In this case, the sensing element 21 is integrally continuous and is made entirely of a magnetic material. Projections 21e2 that project from the vertical plate 21e serve to securely hold leads 22.

What is claimed:

1. Apparatus for measuring a load on a vehicle having oppositely spaced axle cases, a slide plate mounted on a top surface of each of said axle cases, and a leaf spring carrying a vehicle load extending between and slidingly supported at each end by one of said slide plates, said apparatus comprising:

a pair of mounting locations, each being disposed adjacent one of a pair of oppositely spaced ends on an inner surface of each said slide plate, a sensing element disposed at each said mounting location, said sensing element outputting an output in accordance with a sensed vehicle load; and means for adding said outputs of said sensing elements to output a sum of said outputs of said sensing elements.

2. The apparatus according to claim 1, wherein said sensing element is of a generally U-shape and has opposed walls, each of which is formed with a slit, and a plate-like member made of a magnetic material being inserted into said slits to be held therein;

each said mounting location being a groove into which said sensing element is fitted; wherein said construction further includes:
   a lid which fits over said sensing element and into said mounting location so as to hold said sensing element in said mounting location; and
   a wedge-like key inserted between said sensing element and said slide plate.

3. The apparatus according to claim 1, wherein said sensing element is of a generally T-shape and includes:

a plate-like member formed of a magnetic material; and
   a bottom plate on which said plate-like member stands upright, wherein said mounting location is a groove into which said sensing element is fitted; and wherein said apparatus further includes:
   a lid which fits over said sensing element as well as into said mounting location; and
   a wedge-like key having a beveled surface, said wedge-like key being inserted between said sensing element and said slide plate so as to hold said sensing element in said mounting location.

4. The apparatus according to either one of claims 2 or 3, wherein said sensing element has a projection with a beveled surface, said beveled surface having a slope cooperable with said beveled surface of said wedge-like key for securing said sensing element in said mounting location.

* * * * *